United States Patent Office 3,497,364
Patented Feb. 24, 1970

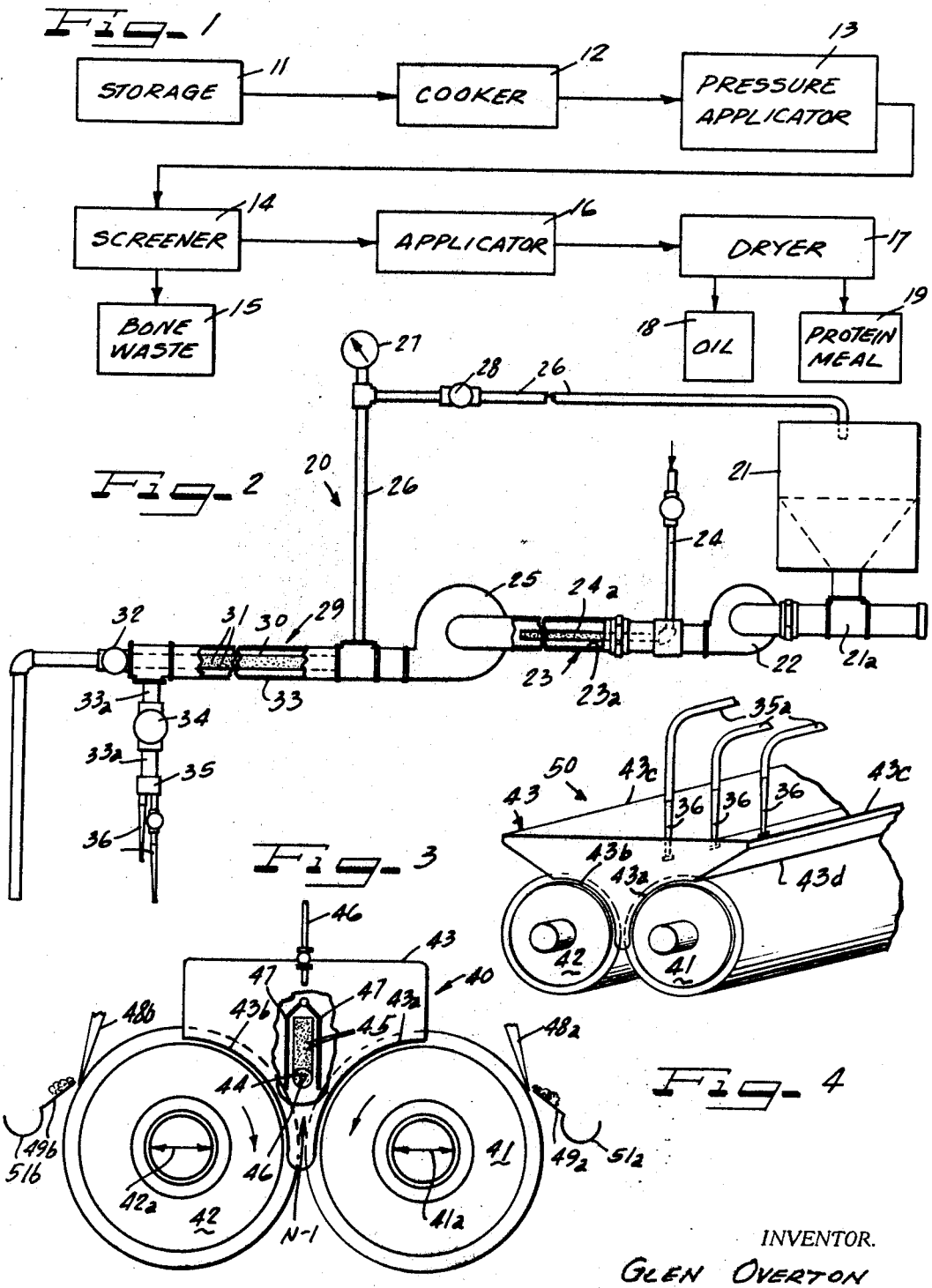

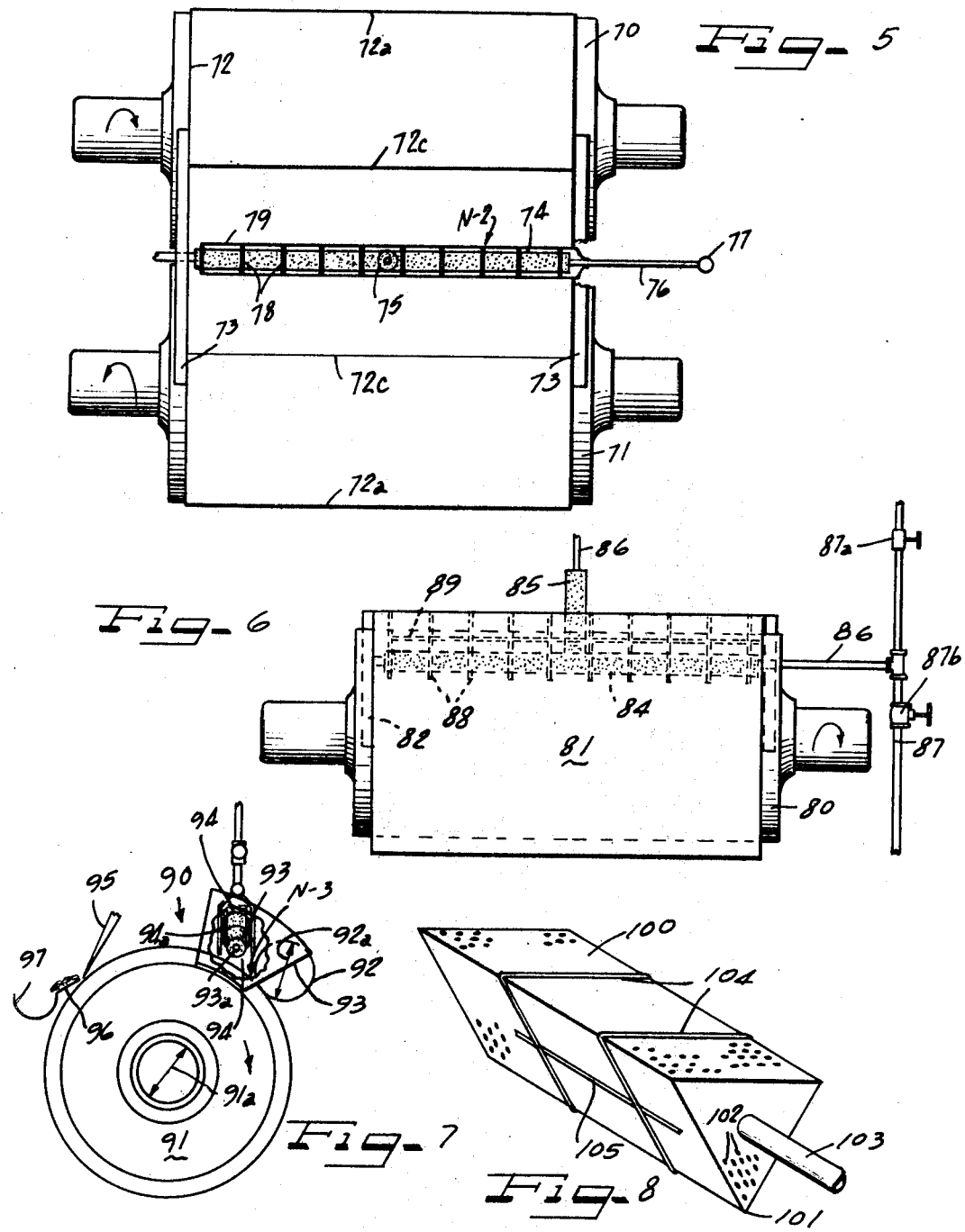

1

3,497,364
APPARATUS FOR MAKING PROTEIN-MEAL
Glen Overton, Allegan, Mich. 49010
Filed May 25, 1967, Ser. No. 641,279
Int. Cl. A23k *1/10*
U.S. Cl. 99—235        12 Claims

ABSTRACT OF THE DISCLOSURE

An apparatus for producing protein-meal and removing liquor extracts from fish, poultry and other protein-containing materials by at least partially deteriorating the material by cooking or chemical action and pressurizing the protein-containing material under a relatively high pressure. The partially deteriorated protein-containing material is then separated from any inedible skeletal matter and the pressure is abruptly released to form a protein slurry. The protein slurry is subjected to pressure, preferably while being worked as by rolling or kneading, to substantially separate the protein solids from the liquors thereof and the protein solids are then drum dried.

BACKGROUND OF THE INVENTION

This invention relates generally to protein-meal production and more specifically to a novel apparatus for producing meal, such as fish meal, and recovering liquor extracts from various protein-containing materials.

Fish meal and oils are presently produced from inedible portions of fish, though some industrial or scrap fish, such as menhaden, are caught only for fish meal production purposes. Fish meal is currently produced by a dry-rendering and by a wet-rendering process. Solvent extraction methods are also used. In the dry-rendering operation, the raw fish are ground and dried under vacuum in a steam-jacketed dryer. The dried meal is pressed hydraulically to remove excess oil which is then purified by use of a settling tank or centrifuge. The raw fish for wet-rendering are ground, cooked and pressed in a continuous screw type device to remove excess oil and water. The fish meal is dried in direct flame, steam-jacketed or steam-tube dryers. The press liquor is centrifuged to separate the oil from the other constituents of the liquor and purified for various industrial uses.

The disadvantages of the present day process for producing fish meal include relatively high energy consumption during the preparation of the fish meal, inefficient drying methods and cumbersome processing equipment. Further, excessive liquor material is retained within the fish after the pressing operation, which must be removed for the attainment of the desired fish meal. In addition, excessive time and equipment is presently required to produce fish meal and extracted oils therefrom.

It has now been found that a more efficient process and apparatus can be used in a novel treatment of not only fish but also poultry and other like protein-containing material. It has further been found that time and equipment necessary to produce protein-meal and liquor extracts therefrom can be considerably reduced, thereby allowing more economical production of protein-meal and liquor extracts therefrom. It has yet further been found that the energy requirements can be materially reduced in the production of protein-meal and liquor extracts therefrom in accordance with the principles of the instant invention, thereby allowing for further economical reduction of protein-meal and liquor extracts therefrom.

SUMMARY OF THE INVENTION

It is, therefore, an important object of the instant invention to provide a novel apparatus capable of continuously producing protein-meal and liquor extracts from various protein-containing materials.

It is another object of the invention to provide a novel apparatus capable of continuously producing protein-meal by novel removal of skeletal matter and substantial portions of the liquor from various protein-containing materials prior to the drying of the protein-meal.

It is yet another object of the invention to provide a novel apparatus for producing protein-meal by cellular rupture, separating the protein solids from the liquors thereof to obtain more efficient drying of the protein solids.

It is another object of the invention to provide a novel apparatus for continuously and controllably drying protein slurry to obtain high quality protein-meal.

It is a further object of the invention to provide a novel apparatus for continuously producing protein-meal and liquor extracts from various protein-containing materials by subjecting the protein materials to a chemical action such as cooking or treatment with chemicals to disrupt the material, and change their natural order, applying a relatively high pressure to the disrupted protein materials and separating the protein materials from any skeletal matter; thereafter abruptly releasing the pressure to cause cellular rupture of the protein-containing materials to form a slurry thereof and then dispersing the protein slurry into a pond on a heated rotating drying surface where the slurry is kneaded or worked with the application of regulated pressure to separate liquor extracts from the protein-meal; removing the liquor extracts and spreading a relatively thin layer of the protein-meal onto the drying surface and removing the protein-meal as it becomes dried.

Other objects, features and advantages of the present invention will become more apparent as the invention is more thoroughly discussed in connection with the disclosure of the preferred embodiments thereof in the specification, claims and drawings.

BRIEF DESCRIPTION OF THE DRAWINGS

FIGURE 1 is a diagrammatical illustration showing a preferred form of the method of the present invention;

FIGURE 2 is a schematic elevational view, with parts broken away for clarity, of a portion of a preferred form of the apparatus constructed and operating in accordance with the principles of the instant invention;

FIGURE 3 is a schematic elevational end view, with parts broken away for clarity, of another portion of a preferred form of the apparatus constructed and operated in accordance with the principles of the instant invention;

FIGURE 4 is an isometric elevational view, with parts omitted for clarity, illustrating a means of interconnecting the portions of the apparatus illustrated in FIGURES 2 and 3;

FIGURE 5 is a somewhat schematic top plan view, with parts omitted for clarity, showing additional details of the apparatus illustrated in FIGURE 3;

FIGURE 6 is a somewhat schematic side plan view illustrating further details of the apparatus as shown in FIGURE 5;

FIGURE 7 is a schematic elevational end view, with parts broken away for clarity, showing a modified embodiment of a portion of the apparatus constructed and operated in accordance with the principles of the instant invention; and FIGURE 8 is a perspective plan view illustrating one embodiment of a portion of the apparatus used in the practice of the instant invention.

DESCRIPTION OF THE PREFERRED EMBODIMENTS

As illustrated in FIGURE 1, a continuous process for the production of protein-meal is shown, wherein protein-containing material, such as fish, poultry, etc., are stored in a storage container 11.

The protein-containing material, which includes not only fish (whole or waste scraps thereof, including heads, tails and other inedible portions thereof) but also poultry meats and waste scraps thereof, as well as other types of meats and scraps therefrom and even including vegetables, such as potatoes, corn, etc. This protein-containing material may be utilized as such and conveyed directly to the storage container 11 from a suitable source of supply or, if desired, it may be first processed through a hammermill, chopper or other similar device to reduce the protein-containing material into substantially uniformly sized particles which are then suitably conveyed to the storage container 11. The hammermill device need not be utilized where relatively small pieces of protein-containing material are obtainable, as for example, from a butchering operation removing the meat, etc. for human food so that only waste protein-containing material is left, however, it will be appreciated that in certain instances it may be desirable to use a hammermill where substantially larger pieces of protein-containing material is utilized.

The storage container 11 has a suitable discharge mechanism (not shown) which permits the protein-containing material to pass continuously into a cooker unit 12 wherein the protein-containing material is substantially uniformly disrupted, denaturated, or otherwise rendered pliable, to be readily freed from skeletal matter or to render the skeletal matter edible. The proteein-containing material is maintained within the cooker unit 12 for a period of time ranging from 20 to 150 seconds to substantially render pliable, or at least partially cook or deteriorate the "flesh-portions" of the protein-containing material. Depending upon the type of protein-containing material being processed, a temperature of 100° C. to 160° C. is maintained within the cooker 12 to effect the deterioration or denaturation of the protein-containing material. Chemicals such as non-toxic acids or bases can be used to soften the protein-containing material.

Denaturation, deterioration or disruption of the protein-containing material may be defined as internal breakdown of the generally highly ordered structure of protein molecules, which may or may not involve actual splitting of the various protein molecules. Denaturation, deterioration or disruption may be effected by heating the protein-containing material at a higher temperature or by exposure to various chemicals, such as acids, bases, alcohol, etc. Denaturation, deterioration or disruption is progressive and probably not a single chemical change, as different agents applied in different ways for different times may give a whole series of different denaturated, deteriorated, or disrupted products. Nevertheless, denaturated, deteriorated, or disrupted protein materials have sufficiently different physical properties from natural-state protein-containing materials so that this definition has utility in the present discussion and will be understood to include the common phenomena known as cooking.

The cooked protein-containing material is then continuously passed into a pressure applicator 13 wherein relatively high pressure, generally in the range of 200 to 1000 p.s.i., is applied. The pressurized protein-containing material is then continuously passed through a screener 14 to separate any skeletal or bone matter that may be present from the protein-containing material. The skeletal or bone matter is collected in the appropriate station 15 for utilization as fertilizer or the like. The protein-containing slurry is then continuously passed to an applicator 16 whereat the pressure is abruptly and suddenly released causing substantial cellular rupture of the protein material, releasing liquors, oils, etc. normally present within these protein-containing materials, so as to form a protein slurry. The protein slurry is next passed to a dryer 17 whereat substantially simultaneously regulated pressure is applied to the protein slurry causing a separation of the protein-meal from the liquors thereof, with the removal of the liquors at an appropriate station 18 for oil extraction and the like, and the protein solids are efficiently and controllably dried for removal at a station 19 to become relatively highly concentrated protein-meal.

As shown in FIGURE 2, a first portion 20 of a preferred embodiment of the apparatus for the production of protein-meal is shown. A storage container 21 receives whole fish, fish scraps, fish waste and similar protein-containing material from an appropriate source (not shown), such as a conveyor belt or an appropriate particle sized reduction device. As set forth hereinbefore, the storage container 21 may include or be preceded by a hammermill (not shown) or a similar device to render the fish, poultry, etc. into a suitable uniform mixture containing particulated protein-containing materials, natural juices, skeletal matter, etc. However, a hammermill or similar device is not needed when relatively small fish or relatively small sized protein-containing materials are being processed. The relative size of the processed materials greatly influences the extent of particle reduction necessary to obtain a fast, efficient and economical process. In other words, the larger the particles of protein-containing material being processed, the greater the expenditures of energy, etc. will be necessary to produce protein-meal.

The storage container 21 is connected by an appropriate conduit means 21a to a pump 22 which removes the protein-containing mixture from the storage unit 21 and forces it into a cooker unit 23. The pump 22 is of a standard involute-type pump capable of moving solid containing mixtures and preferably it developes a pressure of about 10 to 100 p.s.i. The cooker unit 23 has a relatively large diameter heat-insulated imperforated hollow cylindrical body 23a, the interior of which is preferably stainless steel or similar non-toxic material. The cooker unit 23 has means 24, such as a steam inlet, to heat the protein-containing mixture substantially uniformly, by appropriate heat distribution means, such as a relatively small diameter inner cylindrical body 24a which is substantially uniformly perforated to allow uniform contact between the injected steam, which may be under pressure, and the protein-containing mixture so as to uniformly heat the mixture to about 100° C. to 160° C. in a time range of 20 to 150 seconds, depending upon the material being processed.

The cooked, denaturated, or deteriorated mixture is then continuously forced into a relatively high pressure pump 25 which preferably develops a pressure of at least 200 to 1000 p.s.i. The pump 25 may be of any desired form, such as a standard hydraulic involute-type pump as shown, or a fan-type pump, or any other type pump capable of handling a solid containing mixture and developing relatively high pressures.

The pressurized mixture is then force fed into a screener unit 29, with an excess portion of the mixture passing through conduit 26 to activate pressure gauge 27 and continue through valve 28 back to the storage container 21 to again pass through the hereinbefore described cycle. A substantial portion of the pressurized mixture is pressure fed from pump 25 into one end of a hollow perforated inner cylindrical body 30. The perforated body 30 has substantially uniform spaced perforations 31 extending substantially uniformly over its peripheral surface in a size range of about 0.50 to 0.0156 inch. The opposed end of hollow perforated cylindrical body 30 is suitably sealed by a pressure valve 32 which prevents the mixture from passing through the cylindrical body 30 along the axis of the body 30.

Surrounding the inner perforated body 30, is an outer imperforated body 33 which is substantially coextensive with the inner perforated body at least from the delivery end of the pump 25 up to the pressure valve 32. As the mixture is forced into the inner peripheral body 30, the pressure forces the deteriorated cooked protein-containing material (flesh) through the perforations 31 and into the outer imperforated body 33, thereby separating skeletal or bone matter (undeteriorated protein-containing material) from the deteriorated, disrupted or cooked protein-containing material. The outer cylindrical body terminates adjacent the pressure valve 32 and has an appropriate conduit means 33*a* passing through valve 34 into a distributor unit 35. The screened protein-containing material is then pressure fed through the outer cylindrical imperforated body 33 through conduit means 33*a* and pressure valve 34 into the distributor unit or dispenser 35. The skeletal matter remaining within perforated body 30 is packed against pressure valve 32 and at intervals, passed therethrough for collection and use as fertilizer, bone-black, etc. The pressurized mixture is distributed by dispenser 35 into a plurality of applicator nozzles 36 (although it will be appreciated that a single nozzle could also be utilized), whereat the pressure is abruptly released, causing substantial cellular rupture of the protein-containing material, releasing various oils, water, and other liquors within the protein-containing material from the solid fibers thereof. The ruptured protein-containing material is applied by the nozzles 36 to appropriate drying means, as will be hereinafter explained.

It will be appreciated, that the pressure from nozzles 36 will be about 500 to 2000 p.s.i., depending upon the diameter of the discharge port in the nozzles 36. This relatively high pressure is abruptly and suddenly released as the screened protein-containing material is "shot out" of the nozzles 36 onto the drying means causing the liquors, etc. within the protein-containing material to stretch and burst the cellular walls thereof, so as to rupture the cells and expose the oils, moisture, liquors, etc. thereof for subsequent removal. The ruptured protein-containing material thus forms a protein slurry for further processing as explained hereinafter.

As shown in FIGURE 3, a second portion 40 of a preferred embodiment of the apparatus for the production of protein-meal and liquor extracts is shown. A pair of dryer drums 41 and 42, respectively, are mounted for rotation in a conventional manner to define therebetween a working nip N–1. The dryer drums 41 and 42 are provided with adjustment means 41*a* and 42*a* to vary and control the spacing at the nip N–1. The adjustment means 41*a* and 42*a* may be manually or automatically controlled and will regulate the amount of pressure exerted at the nip N–1. The dryer drums 41 and 42 are preferably internally heated and may be similar to the construction disclosed in my U.S. Letters Patent No. 3,308,554 (which patent is hereby incorporated by reference) or to the device disclosed and claimed in my co-pending application Ser. No. 599,060, filed Dec. 5, 1966, now Patent No. 3,426,839 (which application is hereby incorporated by reference). Preferably, the dryer drums 41 and 42 are internally steam heated to obtain a peripheral surface temperature of about 100° C. to 150° C. to dehydrate the protein solids so that they contain less than 10% moisture and at least up to 70% proteins. Further, in certain applications it may be desirable that the protein-containing material be further cooked, deteriorated, etc. at the contact areas with the respective dryer drums, whereat higher temperatures or longer contact times may be utilized.

Mounted above the dryer drums 41 and 42 is a housing shield or trough 43, which is in close-running relationship with the peripheral surfaces of the dryer drums 41 and 42 and is substantially coextensive with the axis of the respective dryer drums. The shield 43 is provided with lower inwardly curving end surfaces 43*a* and 43*b*, respectively, that substantially conform to the upper curved end surfaces of the dryer drums. The shield 43 receives the ruptured protein-containing slurry from the applicator nozzles 36 (as best seen in FIGURES 2 and 4) and prevents the exploding slurry from splattering, splashing or otherwise escaping. The shield 43 thereby forms end-dams and side-dams (as best seen in FIGURES 4 and 5) to prevent the protein slurry from escaping beyond the axial peripheries of the dryer drums.

Immediately above the nip N–1 and in close-running relationship with the peripheral surfaces of the dryer drums 41 and 42, a straining means 44 is appropriately mounted. Straining means 44 may be in the form of a substantially rigid elongated cylindrical member, which is hollow, and provided with a multiplicity of substantially uniformly spaced fine perforations 45. The straining means 44 may be of any other appropriate form having a fine-screened peripheral surface, such as for example, the triangularly-shaped body shown at FIGURE 8, which is capable of passing the oils, moisture and other liquor extracts from the protein slurry so as to substantially separate the protein liquors from the solids thereof. The perforations 45 on the surface of straining means 44 are generally in the size range of about 0.01 to 0.005 inch.

Centrally mounted along the axis of straining means 44 is a conduit means 46 for directing and removing the protein liquors within the straining means 44 away from the working nip N–1. The conduit means 46 may be subjected to reduced pressure, such as partial vacuum, to aid in the liquor removal. The removed protein liquors may then be appropriately purified, separated and classified to obtain desired protein oils, etc. for numerous industrial uses.

Strainer means 44 is provided with a plurality of reciprocably movable agitator means 47, which are periodically spaced along the peripheral axis of strainer means 44 to displace protein solids that may otherwise tend to cake or adhere to the peripheries of the strainer means. The agitator means may be in the form of a plurality of rings, etc. which completely surround the strainer means 44 (as best seen in FIGURE 7) or may be in the form of a plurality of spaced fingers, as shown in FIGURE 3, that extend along the sides of the strainer means 44. The agitator means 47 are carried by a suitable frame (not shown) which is reciprocably driven by a power means to move the agitator means 47 along a limited path immediately adiacent the outer periphery of the strainer means 44, so that all portions of the strainer means, contiguous with the agitator means are periodically cleansed.

Disposed on the off-running sides of working nip N–1 and in working relationship with the peripheries of the dryer drums 41 and 42 are suitable doctor means 48*a* and 48*b*, respectively, removing the dried protein-meal from the surfaces of the dryer drums. In working relationship with the doctor means 48*a* and 48*b* are suitable apron means 49*a* and 49*b*, respectively, for directing the particulated protein-meal into suitable troughs 51*a* and 51*b* for conveyance to packaging stations or the like. Generally, the doctor means 48*a* and 48*b* are disposed approximately 180° to 270° away from the nip N–1.

Referring now to FIGURE 4 wherein a feed means interconnecting the first portion 20 and the second portion 40 of the preferred apparatus for the production of protein-meal is illustrated. The feed means 50 interconnecting portions 20 and 40 of the instant apparatus may be of any desired form for distributing the screened protein-containing material along the nip line of the dryer drums. A suitable device is disclosed in my U.S. Letters Patent 2,484,580 (which patent is incorporated herein by reference). Generally, a plurality of uniformly spaced conduit means 35*a* receives the screened protein-containing material from a distributor device 35 (as generally shown in FIGURE 2) and passes the protein-containing material to the downwardly extending nozzle means 36. The nozzle means 36 which may be tapered as desired, are spaced to deliver one to two tons of the protein-containing material along the nip line formed by dryer drums 41 and 42. The nozzle means 36 lead into the trough 43 and as the protein-material passes beyond the converging nozzle opening, the protein-material undergoes an abrupt and sudden release of pressure to explode or rupture against the peripheries of the dryer drums 41 and 42 and the inner surfaces of the trough 43. The trough 43 is provided with side walls 43c, which may be tapered as at 43d or may be in a straight-line relationship that conforms to the upper curved portions of the dryer drums to maintain the protein slurry above the dryer drums. End dams having curved surfaces 43a and 43b respectively are suitably joined with the side 43c to define a hollow trough 43; the trough 43 generally holds one to two tons of protein slurry and serves as a container therefor above the dryer drum nip for liquor separation and/or further cooking as desired.

As the dryer drums are rotated toward each other, they will tend to circulate and knead or work the protein slurry to cause a separation of the various protein oils and other liquors from the protein solids thereby enabling the strainer means (as shown in FIGURE 3) to gather the separated liquors and remove the same for further processing as desired. As indicated hereinbefore, the protein slurry is thus subjected to regulated pressure, squeezing, kneading, and otherwise working the protein slurry mass to substantially separate the liquids therefrom. The liquids tend to gravitate toward the center and top of the protein slurry puddle where they are removed by strainer means as described hereinbefore.

As shown in FIGURE 5, a pair of dryer drums 70 and 71 are centrally mounted for rotation toward one another and defining therebetween a working nip N–2. Mounted above and in close-running relationship with the upper peripheries of the dryer drums is a shield housing 72 having end dam portions 73 and side dam portions 72a, 72c preventing protein slurry from escaping beyond the axial confines of the dryer drums. Positioned above and in close working relationship with the working nip N–2 is a strainer means suitably mounted. Strainer means 74 is generally in a form of a substantially rigid elongated and hollow body member having a plurality of finely spaced perforations on its peripheral surfaces leading to the interior thereof for the removal of protein liquors as they become separated from the protein solids during the controlled pressure application by the dryer drums to the slurry puddle formed at the nip N–2. A conduit means 76 communicates with the interior of strainer means 74 for removal of the protein liquors to an appropriate location, as at 77. In certain applications, whereat a substantial amount of protein liquor is encountered at the slurry puddle, a vertically extending strainer means 75, substantially similar to strainer means 74, may also be provided. The vertical strainer means 75, likewise, communicates with an appropriate conduit means (not shown) removing the liquor for further processing as desired. A plurality of spaced agitator means 78, interconnected by frame member 79, are provided along the peripheral portions of strainer means 74 to displace and otherwise move the protein solids as they contact the peripheral portions of the strainer 74. Similar agitator means may also be provided for the vertical strainer means 75. The frame member 79, interconnecting the agitator means 78 is suitably reciprocably driven by a power supply (not shown) causing the agitator means 78 to have a limited path of movement along the strainer 74.

As shown in FIGURE 6, a dryer drum 80 is mounted in a conventional manner for rotation about its axis and is preferably internally steam heated as described hereinbefore. The dryer drum 80 is provided with a shield housing 81 having end dams 82 (and side dams, not shown) which are in close-running relationship with the upper portion of the end peripheries of the dryer drums so as to prevent escape of any slurry that is applied to the dryer drums at this portion. As explained hereinbefore, the dryer drum 80 is provided with manual or automatic adjustment means (not shown) to facilitate the regulation of pressure at the working nip so that not only may a controlled, relatively thin layer of protein solids be spread onto the dryer drum surface but a regulated amount of pressure being applied to the slurry puddle at the working nip. This regulated pressure causes substantial separation of the protein liquors from the solids thereof so that 60 to 90% of the liquors are removed prior to the spreading of the protein solids onto the dryer surface for further dehydration. The removal of the protein liquors prior to the spreading of the solids onto the dryer drum surface materially reduces the amount of heat necessary to dehydrate the solids to the desired degree of dryness.

Horizontal straining means 84, substantially similar to that described in conjunction with FIGURE 3, is provided in close working relationship with the working nip of dryer roll 80. In addition, a vertically extending strainer means 85 may also be provided to remove excess free oil that may be formed above the puddle slurry. The strainer means 84 and 85 are each provided with appropriate conduit means 86 for removing the oils, liquids, and other protein liquors from the straining means. Vertically extending conduit means 87 is provided with valve means 87a and 87b to control flow of fluids within conduit 87. Thus, at intermittent intervals it is desirable to shut off valve 87b (leaving valve 87a open) and introducing pressurized fluid, such as steam into conduit 87 and conduit 86. The pressurized fluid is forced into strainer 84 and 86 passing through the perforations therein into the protein slurry, thereby cleaning the perforations for further operation. A vertically extending conduit tube 87 may also apply reduced pressure or the like to the conduit means 86 to aid in the liquor removal by opening both valves 87a and 87b and forcing a fluid therethrough. The horizontal straining means 84 is provided with a plurality of spaced reciprocably movable agitator means 88 which are interconnected to one another by means of frame 89. The frame 89 is suitably driven to move, reciprocably back and forth, a limited distance, so that the agitator means 88 displace any solids that may be adhering to the peripheral surface of the strainer means 84. Vertical strainer means 85 may be provided with like agitator means, however, it has generally been found that the protein solids do not tend to accumulate around the vertically extending strainer means.

As shown in FIGURE 7, another embodiment 90 of the drying means is shown. A single rotary dryer drum 91, which may be substantially similar to the previously described dryer drums, is mounted for rotation about a centroidal axis and provided with adjustment means 91a, allowing either manual or automatic adjustment to regulate the pressure at a nip. A pressure applicator roll 92 is appropriately mounted for rotation so as to define with the upper quadrant of dryer roll 91 a working nip N–3. The pressure roll 92 is also provided with an adjustment means 92a to allow pressure variation at the working nip. This pressure control on the dryer drum and the pressure applicator roll allows a regulated amount of pressure to be applied to the puddle formed at the nip N–3 to substantially separate the protein liquors from the solids thereof and control the thickness of the protein solid layer that is applied to the dryer drum surface. An appropriately shaped housing shield 93 is provided to substantially encompass the working nip N–3 and receive the exploded protein slurry from an appropriate applicator means, such as a nozzle, as hereinbefore described. The housing shield 93 forms end and side dams (not shown) with the portions of the respective surfaces of the dryer drum 91 and the pressure applicator roll 92, so as to prevent the escape of the slurry puddle after it has been applied to the working nip N-3.

In close working relationship with the nip N-3 and being substantially coextensive with the dryer drum 91 and the pressure roll 92, a strainer means 93 is appropriately mounted. Strainer means 93 is substantially similar to that previously described in conjunction with FIGURE 4 and is provided with agitator means 94 which are carried by frame members 94a that are appropriately driven for reciprocal movement, as hereinbefore described. Strainer means 93 is also provided with a conduit means 93a for removal of the liquor from the interior thereof. The dryer drum 91 has associated therewith, an appropriate solid removal means 95, such as a doctor blade, for the removal of the protein-meal as it becomes dried. Associated with the removal means 95 is an appropriate apron means 96 which directs the protein-meal away from the surface of the dryer drum 91 and into a suitable conveyor means 97.

FIGURE 8 illustrates another form of the strainer means that is well suited for use in the instant invention. A triangularly-shaped strainer means 100 is provided with a downwardly extending apex 101 which may extend into extremely close working relationship with a working nip of a pair of dryer drums or a dryer drum and a pressure applicator roll, thereby allowing more efficient removal of the liquor as it is expressed from the protein slurry by rotation of the respective rollers. The triangularly-shaped straining means 100 is likewise provided with extremely fine perforations 102 which allow the liquid to pass into the interior thereof, but prevent the solids from entering the same. In addition, a conduit means 103 may also be provided for removal of the liquor therefrom. Further, suitably fashioned agitator means 104 may be provided in close fitting relationship around straining means 100 to keep its surfaces substantially free of any adhering protein solids. The agitator means 104 are suitably carried by frame members 105 which extend on either side of straining means 100 to reciprocably move, as indicated by the double headed arrow, the agitation means 104 along a limited path to keep the entire surface portion of the straining means 100 clear of any adhering protein solids.

It is to be understood that the foregoing detailed description is given merely by way of illustration and that many variations may be made therein without departing from the scope and spirit of the invention.

I claim as my invention:

1. In an apparatus for the production of protein meal and having means of rendering protein-containing material into a cooked protein stock, the combination comprising, means causing cellular rupture of the protein stock forming a slurry thereof, a pair of rotary dryer drums spaced to define a working nip therebetween applying regulated pressure to the slurry and spreading a relatively thin layer of the slurry onto the dryer drums, a rigid finely perforated and elongated body means above the working nip and in close-running relationship therewith straining liquid from the slurry, a conduit means communicating with the finely perforated body means removing the liquid therefrom, and doctor means in working relationship with the dryer drum on the off-running side of the working nip removing the protein material as it becomes dried.

2. An apparatus as defined in claim 1 wherein the rigid finely perforated and elongated body means is triangularly-shaped having an apex thereof in close-running relationship with the working nip.

3. An apparatus as defined in claim 1 wherein the rigid finely perforated and elongated body means is cylindrically-shaped having its peripheral surfaces in close-running relationship with the respective surfaces of the dryer drums to span the working nip.

4. In an apparatus for the production of protein meal the combination comprising, storage means receiving protein-containing material, heating means communicating with said storage means receiving the protein-containing material and causing at least partial deterioration of the protein-containing material, pressure means communicating with said heating means receiving the partially deteriorated protein-containing material and subjecting it to relatively high pressure, separating means communicating with said pressure means receiving the pressurized partially deteriorated protein-containing material and straining the partially deteriorated protein-containing material from substantially undeteriorated protein material, applicator means receiving the strained partially deteriorated protein-containing material and abruptly releasing the pressure on the protein-containing material causing a slurry thereof, rotary drying means having a working nip receiving the protein-containing slurry and forming a puddle thereof at the nip to apply regulated pressure to the puddle causing separation of protein solids from the liquids thereof and spreading a relatively thin layer of the protein solids onto the drying means, liquid removal means in working relationship with the nip of the drying means for removal of protein liquids, and solid removal means in working relationship with the drying means for removal of protein solids as they become dried.

5. An apparatus as defined in claim 4 wherein the heating means comprises steam injection means communicating directly with a heat-insulated elongated cylindrical body having communicating ports connected with the storage means and the pressure means and the pressure means comprises a hydraulic pump.

6. An apparatus as defined in claim 4 wherein the separating means comprises an inner perforated hollow cylindrical member receiving the pressurized partially deteriorated protein-containing material having an end thereof communicating with a pressure valve, and an outer imperforate hollow cylindrical member surrounding the inner member whereby the pressurized partially deteriorated protein-containing material passes into the outer member and the substantially undeteriorated protein material remains within the inner member for escape through the pressure valve.

7. An apparatus as defined in claim 4 including a shield housing receiving the applicator means and being in close-running relationship with the rotary drying means, said applicator means comprising nozzle means.

8. An apparatus as defined in claim 4 wherein the rotary heating means comprises a pair of internally heated drying drums defining the working nip therebetween.

9. An apparatus as defined in claim 4 wherein the heating means comprises an internally heated dryer drum and a pressure applicator roll defining the working nip with the dryer drum.

10. An apparatus as defined in claim 4 wherein the liquid removal means comprises a hollow elongated substantially rigid and finely perforated member, said member being substantially coextensive with the rotary drying means and a conduit means communicating with the hollow elongated substantially rigid and finely perforated member directing the liquid away from the working nip.

11. An apparatus as defined in claim 10 wherein the conduit means is subjected to reduced pressure.

12. In an apparatus for the production of protein-meal having means of rendering protein-containing material into a cooked protein stock, the combination comprising, means causing cellular breakdown of the protein stock forming a slurry thereof, a pair of rotary dryer drums spaced to define a working nip therebetween applying regulated pressure to the slurry and spreading a relatively thin layer of the slurry onto the dryer drums, a rigid finely perforated and elongated body means above the working nip and in close-running relationship therewith straining liquid from the slurry, spaced agitator means in close-working relationship with said rigid finely perforated body means reciprocably movable along the body means to displace protein material adhering to the peripheries of said body means, a conduit means communicating with said finely perforated body means removing the liquid therefrom, and doctor means in running relationship with the dryer drum on the off-running side of the working nip removing the protein material as it becomes dried.

References Cited

UNITED STATES PATENTS

| | | | |
|---|---|---|---|
| 1,047,760 | 12/1912 | Davidson | 99—235 |
| 3,029,723 | 4/1962 | Schweer | 100—90 X |

ROBERT W. JENKINS, Primary Examiner